(12) United States Patent
Chapman et al.

(10) Patent No.: US 10,772,714 B1
(45) Date of Patent: Sep. 15, 2020

(54) CASE FOR DENTAL APPLIANCES

(71) Applicant: SDC U.S. SmilePay SPV, Nashville, TN (US)

(72) Inventors: Josh Chapman, Nashville, TN (US); Brittany Lacey, Nashville, TN (US)

(73) Assignee: SDC U.S. SmilePay SPV, Nashville, TN (US)

( * ) Notice: Subject to any disclaimer, the term of this patent is extended or adjusted under 35 U.S.C. 154(b) by 0 days.

(21) Appl. No.: 16/438,767

(22) Filed: Jun. 12, 2019

(51) Int. Cl.
| | | |
|---|---|---|
| *G08B 5/22* | (2006.01) | |
| *A61C 19/02* | (2006.01) | |
| *H04W 4/029* | (2018.01) | |
| *G08B 3/10* | (2006.01) | |
| *A61C 7/08* | (2006.01) | |

(52) U.S. Cl.
CPC ............ *A61C 19/02* (2013.01); *G08B 3/10* (2013.01); *H04W 4/029* (2018.02); *A61C 7/08* (2013.01)

(58) Field of Classification Search
CPC ......... A61C 19/02; A61C 7/08; H04W 4/029; G08B 3/10
USPC .......................................... 340/8.1
See application file for complete search history.

(56) References Cited

U.S. PATENT DOCUMENTS

| | | | | |
|---|---|---|---|---|
| 5,425,971 A * | 6/1995 | Chiang-Cheng | ....... | A45D 33/22 206/823 |
| 6,417,761 B1 * | 7/2002 | Elliott | ...................... | A61C 7/00 128/859 |
| D726,377 S | 4/2015 | Koo | | |
| D742,070 S | 10/2015 | Park | | |
| 9,603,690 B1 * | 3/2017 | Lho | ......................... | B65D 25/04 |
| D793,624 S | 8/2017 | Hwang | | |
| 9,980,799 B2 | 5/2018 | Wilson | | |
| D865,180 S | 10/2019 | Bauer et al. | | |
| 2003/0041868 A1 * | 3/2003 | Deloach | .................. | A24F 25/02 131/329 |
| 2005/0048433 A1 * | 3/2005 | Hilliard | ..................... | A61C 7/00 433/24 |
| 2007/0129269 A1 * | 6/2007 | Arce | ..................... | A61C 17/036 510/116 |
| 2007/0205124 A1 * | 9/2007 | Johnsen | .................. | A61C 19/02 206/369 |
| 2008/0283422 A1 * | 11/2008 | Jansheski | ............... | B65D 85/54 206/63.5 |
| 2012/0045729 A1 * | 2/2012 | Ortiz | ........................ | A61C 7/00 433/6 |

(Continued)

OTHER PUBLICATIONS

International Search Report and Written Opinion for International Application No. PCT/US2020/037156, dated Jul. 23, 2020, 7 pages.

*Primary Examiner* — Naomi J Small
(74) *Attorney, Agent, or Firm* — Foley & Lardner LLP

(57) ABSTRACT

A storage case for a dental appliance includes a storage portion, a cover, and a location device. The storage portion includes a compartment that is configured to hold a dental appliance of a user. The cover is coupled to the storage portion and configured to selectively move between an open position and closed position. The cover permits access to the compartment when in the open position and restricts access to the compartment when in the closed position. The location device includes a communications device and a speaker. The speaker is configured to generate a sound based on the communications device receiving a signal from a mobile device of the user.

21 Claims, 12 Drawing Sheets

(56) References Cited

U.S. PATENT DOCUMENTS

| | | | |
|---|---|---|---|
| 2012/0067769 A1* | 3/2012 | Rein | B65D 51/245 |
| | | | 206/581 |
| 2014/0013456 A1 | 1/2014 | McWhirter et al. | |
| 2014/0021089 A1* | 1/2014 | Bellas | A45C 11/008 |
| | | | 206/581 |
| 2014/0134561 A1* | 5/2014 | Smith | A61B 5/14551 |
| | | | 433/6 |
| 2014/0326273 A1* | 11/2014 | Kalyanpur | A45D 33/008 |
| | | | 132/314 |
| 2015/0021211 A1* | 1/2015 | Chastain | A63B 71/0036 |
| | | | 206/63.5 |
| 2016/0100924 A1* | 4/2016 | Wilson | H02J 50/10 |
| | | | 206/63.5 |
| 2016/0249168 A1* | 8/2016 | Evans | G06F 21/88 |
| 2017/0352250 A1* | 12/2017 | de Barros Chapiewski | |
| | | | H04W 4/021 |
| 2018/0000231 A1 | 1/2018 | Trubey | |
| 2018/0000563 A1 | 1/2018 | Shanjani et al. | |
| 2018/0071420 A1* | 3/2018 | Bestel | A61L 2/26 |
| 2019/0021473 A1* | 1/2019 | Prewitt | A61C 17/036 |
| 2019/0105144 A1* | 4/2019 | Buenrostro | A61C 19/02 |
| 2019/0116957 A1* | 4/2019 | Montoli | A45D 40/221 |

* cited by examiner

CASE FOR DENTAL APPLIANCES

BACKGROUND

Users of dental appliances, such as dental aligners for repositioning teeth or retainers for maintaining the position of repositioned teeth, typically do not wear a dental appliance at all times, such as when eating, drinking, brushing their teeth, or when cleaning the dental appliance. Some dental aligners are only intended to be worn for a certain number of hours a day. Some retainers are only intended to be worn by a user when sleeping. When a dental appliance is not being worn, the dental appliance is subject to being dirtied, damaged, misplaced, or lost.

SUMMARY

One embodiment relates to a storage case for a dental appliance. The storage case includes a storage portion including a compartment configured to hold a dental appliance of a user. The storage case includes a cover coupled to the storage portion and configured to selectively move between an open position and a closed position. The cover permits access to the compartment when the cover is in the open position and the cover restricts access to the compartment when the cover is in the closed position. The storage case includes a location device having a communications device and a speaker. The speaker is configured to generate a sound based on the communications device receiving a signal from a mobile device of the user.

Another embodiment relates to a storage case for a dental appliance. The storage case includes a storage portion including a compartment having a circular shape and being configured to hold a dental appliance of a user. The storage case includes a cover coupled to the storage portion proximate an opening of the compartment and configured to selectively move between an open position and a closed position. The cover permits access to the compartment when the cover is in the open position and restricts access to the compartment when the cover is in the closed position. The storage case includes a base coupled to the storage portion opposite the cover. The base includes a bottom surface facing away from the storage portion and a top surface facing toward the storage portion. The top surface includes a reflective portion. The base is movable with respect to the storage portion between an open position where the top surface is viewable by a user and a closed position where the top surface is not viewable by the user.

Another embodiment relates to a method of locating a storage case for a dental appliance. The method includes receiving, by the mobile device, location-based data from a location device incorporated into a storage case for a dental appliance. The location-based data corresponding to a location of the storage case. The method includes rendering, on a user interface of the mobile device, a location of the storage case with respect to the mobile device. The method includes receiving, via the user interface, a user input requesting assistance in locating the storage case. The method includes transmitting a signal to the location device of the storage case based on the user input, the signal configured to cause a speaker of the location device to generate a sound for assisting the user in locating the storage case.

DETAILED DESCRIPTION

Figure 1:
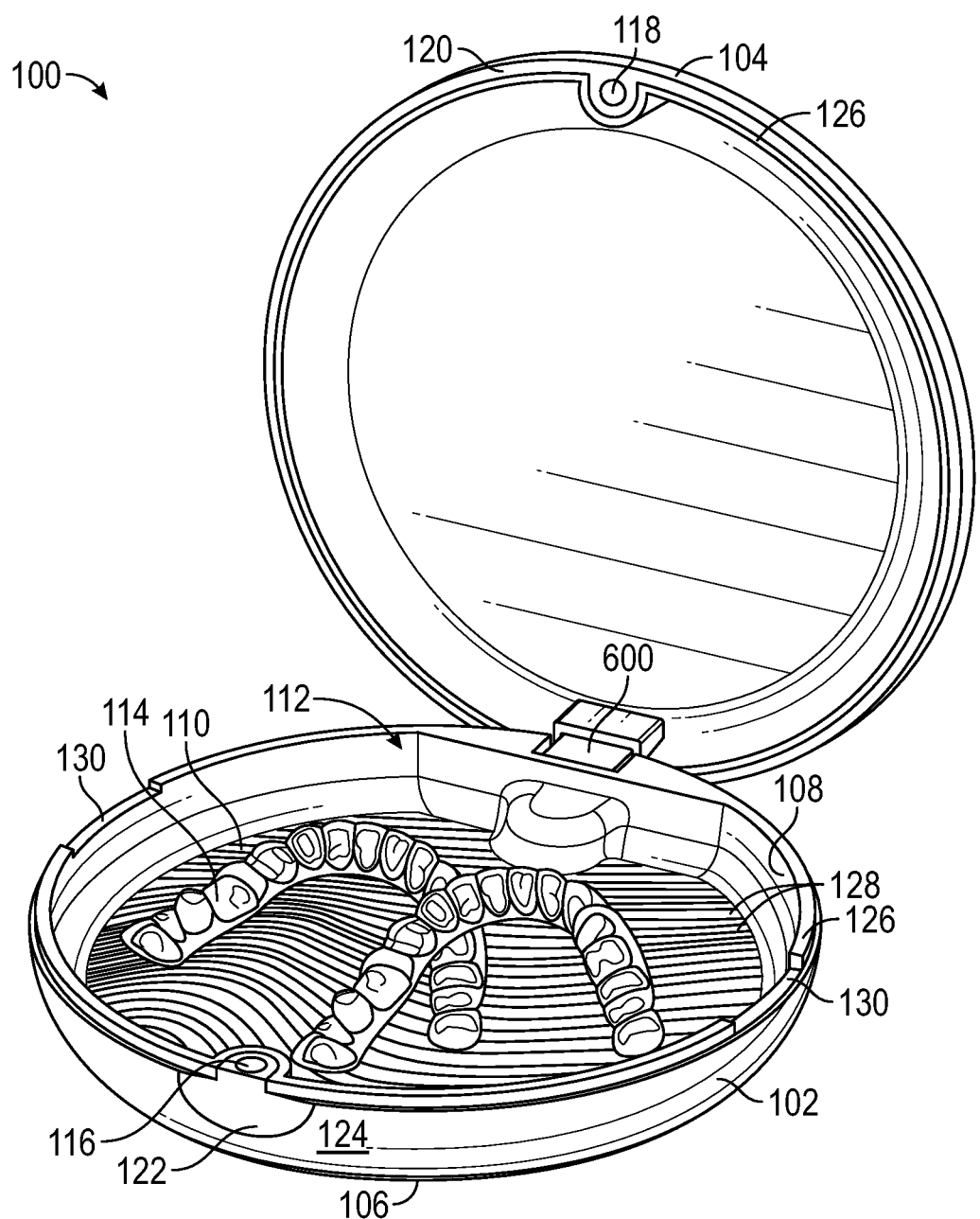
FIG. 1 is a perspective view of a storage case for a dental appliance in an open configuration, according to an illustrative embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, described is a storage case for a dental appliance. The storage case includes a main compartment defined by an interior base and an interior wall having a circular shape surrounding the interior base. The main compartment is configured to hold and retain a dental appliance. The storage case includes a cover coupled to the main compartment and configured to selectively move between an open position and a closed position. The cover permits access to the main compartment when the cover is in the open position and restricts access to the main compartment when the cover is in the closed position.

In some embodiments, the storage case includes a location device having a speaker and a location sensor. A mobile device of a user is configured to receive location-based data corresponding to the storage case and to provide a signal to the location device for causing the speaker to generate a sound to assist the user in locating the storage case. According to such embodiments, the storage case may assist users in locating the storage case (e.g., via the location device), and thus their dental appliance when the user stores their dental appliance in the storage case. When the user misplaces the storage case having the dental appliance, the user may select an option for locating the storage case on the user's mobile device. The option may include identifying the last known (or current) location of the storage case on a map. The option may include sending a signal which causes the speaker of the location device to generate a sound. Each of these options, or a combination of these options, may assist the user in locating their storage case and its contents. Such embodiments may reduce the likelihood of misplacing the user's dental appliance and, accordingly, reduce the likelihood of incurring replacement costs for misplaced dental appliances.

In some embodiments, the storage case includes a base coupled to the main compartment opposite the cover. The base includes a bottom surface and a top surface including a mirrored portion. The base is movable with respect to the main compartment between an open position where the top surface is viewable by a user and a closed position where the top surface is not viewable by the user. According to such embodiments, the user may use the storage case to help position the dental appliance in the user's mouth. For instance, a user can position the dental appliance in the user's mouth regardless of where the user is with the assistance of the mirrored portion of the top surface. Such embodiments provide convenient access to a mirror at any given location, so long as the user has the storage case on their person.

Various other embodiments and advantages will become apparent according to the description which follows.

Figure 2:
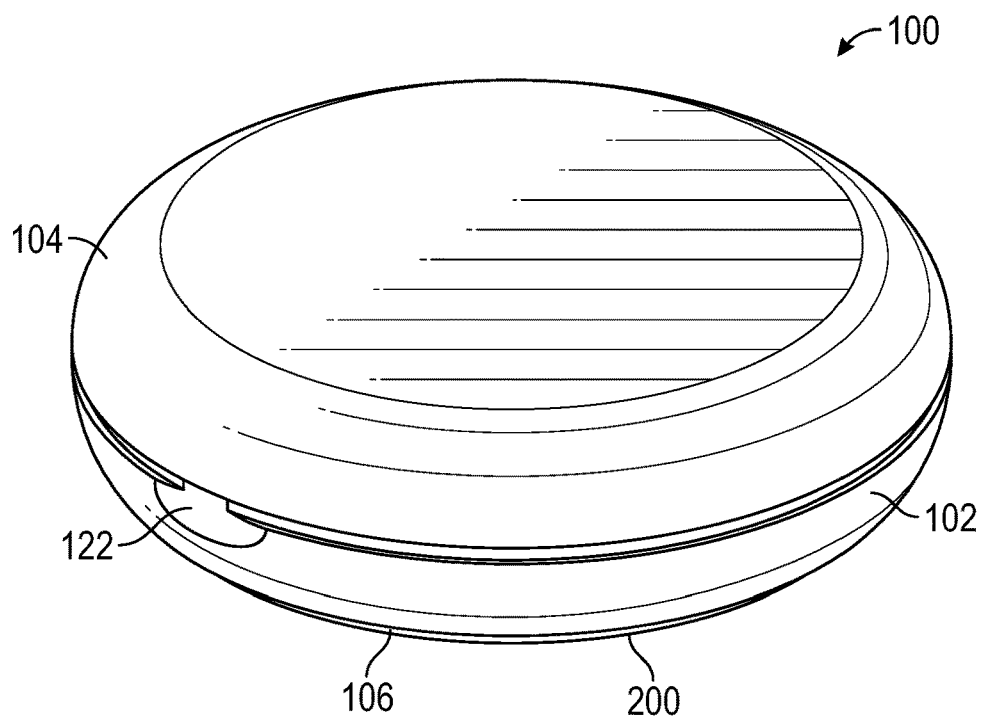
FIG. 2 is a perspective view of the storage case of FIG. 1 in a closed configuration, according to an illustrative embodiment.
Figure 3:
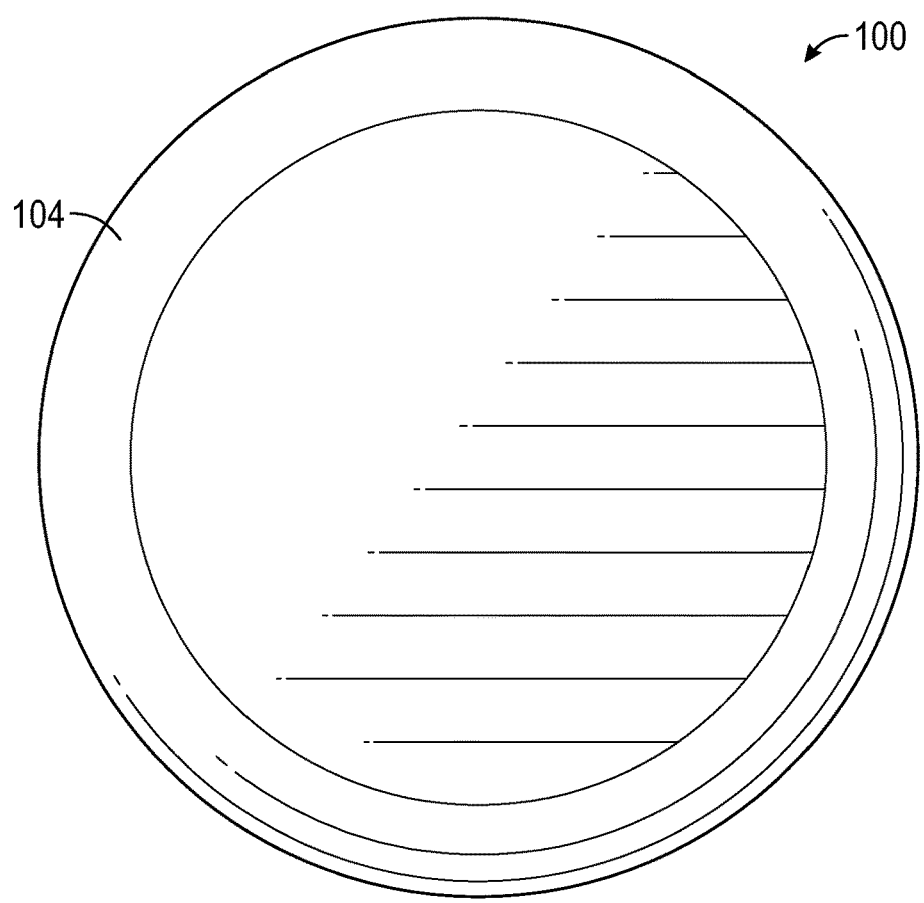
FIG. 3 is a top view of the storage case of FIG. 1, according to an illustrative embodiment.
Figure 4:
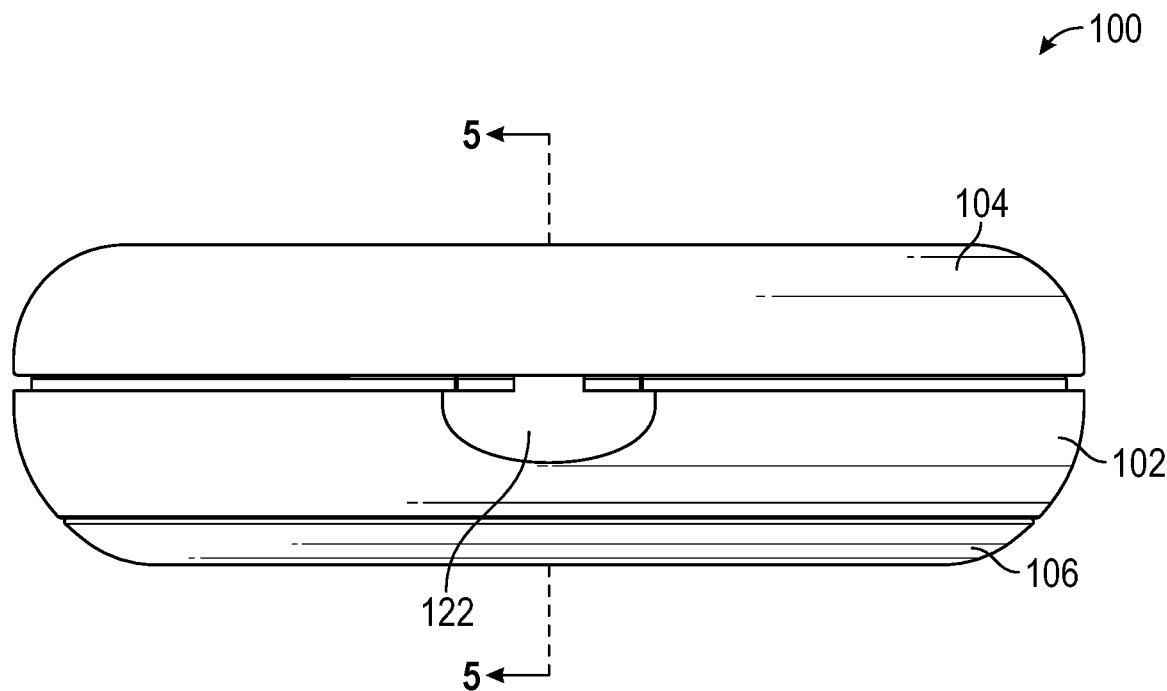
FIG. 4 is a side view of the storage case of FIG. 1, according to an illustrative embodiment.
Figure 5:
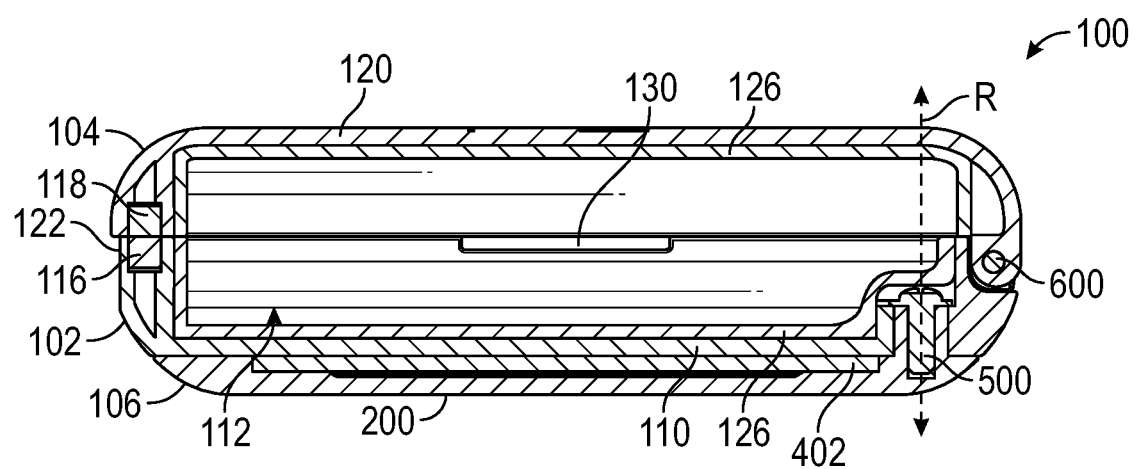
FIG. 5 is a cross-sectional view of the storage case of FIG. 1, according to an illustrative embodiment.
Figure 6:
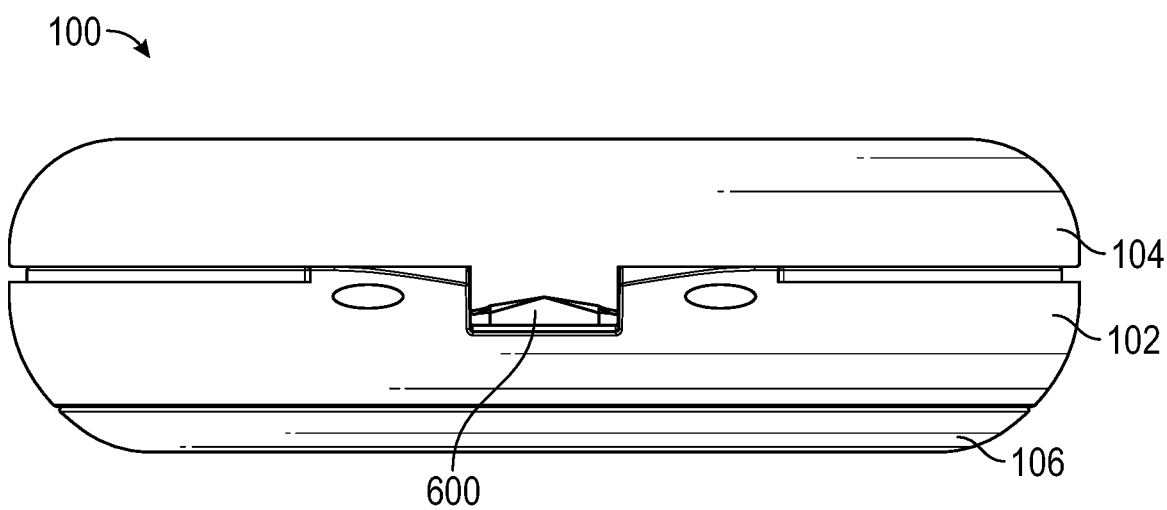
FIG. 6 is a rear view of the storage case of FIG. 1, according to an illustrative embodiment.
Figure 7:
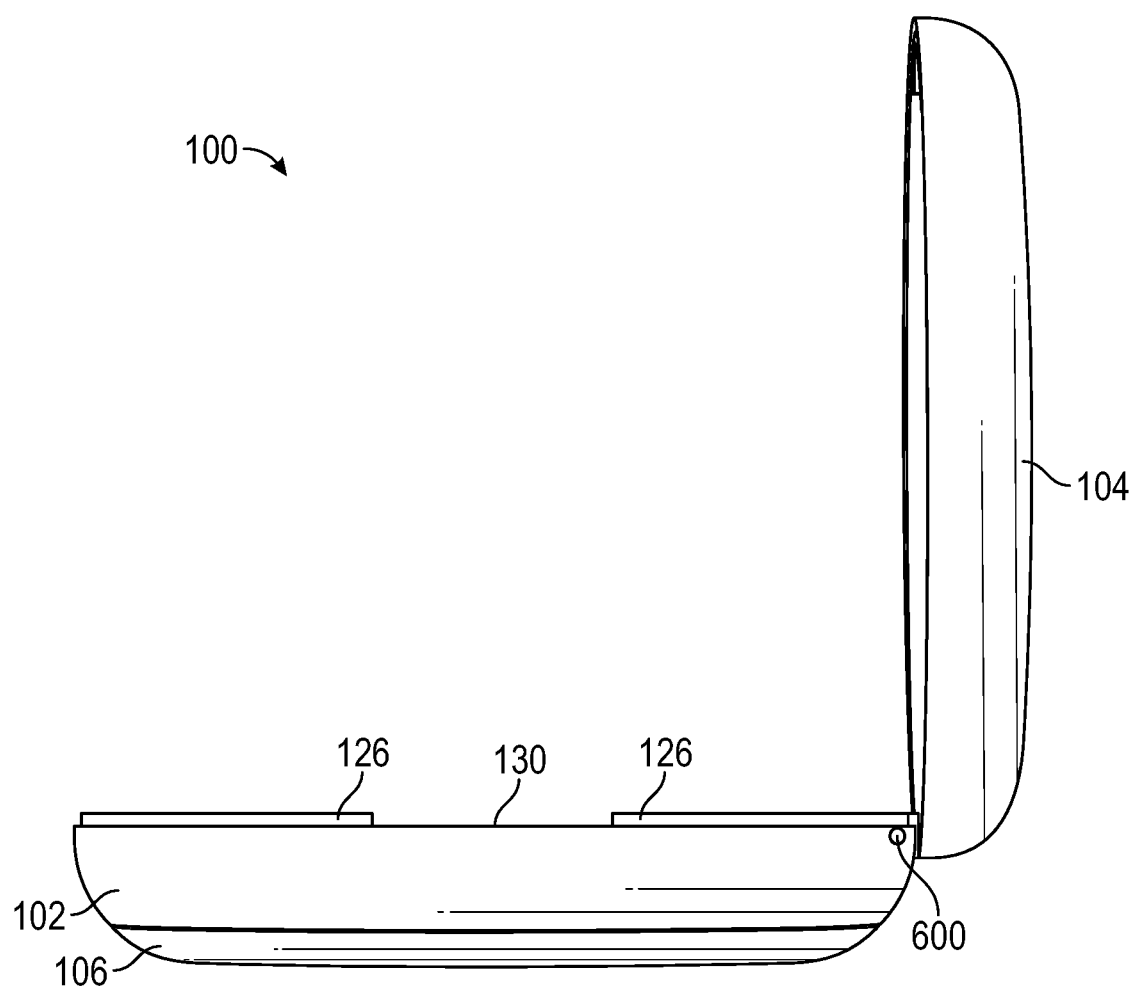
FIG. 7 is a side view of the storage case of FIG. 1 in an open configuration, according to an illustrative embodiment.

Referring now to FIG. 1-FIG. 7, various views of a storage case 100 are shown. Specifically, FIG. 1 is a perspective view of the storage case 100 in an open configuration, FIG. 2 is a perspective view of the storage case 100 in a closed configuration, FIG. 3 is a top view of the storage case 100, FIG. 4 is a side view of the storage case 100, FIG. 5 is a cross-sectional view of the storage case 100 taken along plane 5-5, FIG. 6 is a rear view of the storage case 100, and FIG. 7 is a side view of the storage case 100 in the open configuration, according to illustrative embodiments. The storage case 100 is shown to include a storage portion 102, a cover 104, and a base 106. The storage portion 102 may include an interior wall 108 and interior base 110. The interior wall 108 may surround the interior base 110 (e.g., along a perimeter of the interior base 110). The interior wall 108 and interior base 110 may together define a main compartment 112 for the storage case 100.

The storage portion 102, cover 104, and base 106 may be constructed of various materials such as, various types of plastics, resins, composites, etc. The storage case 100 may generally have an oblong or an oblong-like shape. The main compartment 112 may be designed or implemented to have a size configured to hold and retain a dental appliance 114. For instance, the storage portion 102 may have an interior diameter that is at least as wide as an average person's mouth, an above-average person's mouth, etc. The main compartment 112 may thus be sized to hold and retain dental appliances 114 to be worn in a user's mouth (e.g., on the user's teeth in the case of dental aligners).

The dental appliance 114 includes any device, component, or appliance configured to be worn on a user's teeth in accordance with dental or orthodontic treatment. As one example, the dental appliance 114 may be dental aligners (shown in FIG. 1) configured to reposition one or more teeth of the user in accordance with a treatment plan. As another example, the dental appliance 114 may be a retainer configured to be worn for maintaining a position of a user's teeth following orthodontic treatment, such as orthodontic treatment by way of dental aligners. As yet another example, the dental appliance 114 may be whitening trays configured to be worn for whitening the user's teeth. In another example, the dental appliance 114 can be a mouth guard for protecting the teeth of the user.

As can be best seen in FIG. 4, the storage case 100 is shown to include a cover 104 and a base 106. The cover 104 and base 106 are shown to be coupled to the storage case 100 at opposite sides of the main compartment 112. In some embodiments, the cover 104 is movably coupled to the storage portion 102 and the base 106 is movably coupled to the storage portion 102 opposite the cover 104 (e.g., on the opposite side of the interior base 110). The cover 104 is configured to selectively move between an open position (shown in FIG. 1) and closed position (shown in FIG. 4). When the cover is in the open position, the cover 104 permits access to the main compartment 112 and the contents thereof.

As shown in FIG. 1, FIG. 6, and FIG. 7, the cover 104 is pivotably coupled to the storage portion 102. The cover 104 is coupled to the storage portion 102 via a hinge 600. The hinge 600 defines an axis about which the cover 104 pivots relative to the storage portion 102. In some embodiments, the cover 104 pivots approximately 90° relative to the storage portion 102 to expose the main compartment 112. The hinge 600 may be configured to provide a greater or lesser range of motion of the cover 104 relative to the storage portion 102.

In some embodiments, the storage case 100 includes a fastening system. The fastening system is shown to include a first fastening portion 116 positioned on or along the interior wall 108 and a second fastening portion 118 positioned on an interior-facing surface 120 of the cover 104. The second fastening portion 118 is configured to engage the first fastening portion 116 of the interior wall 108 to maintain the position of the cover 104 with respect to the main compartment 112. In some embodiments, the first fastening portion 116 and the second fastening portion 118 may be or include magnets that are attracted to one another when in close proximity (e.g., when the cover 104 is aligned with the main compartment 112 in the closed position or when the cover 104 is near to being in the closed position). In some embodiments, the first fastening portion 116 and the second fastening portion 118 include a detent and tab. The tab may snap into the detent as the tab is pushed into the detent. Similar fastening systems may be positioned on the base 106 to maintain the position of the base 106 with respect to the storage portion 102, as described in greater detail below. In some embodiments, the storage case 100 includes a recess 122. The recess 122 is defined along an exterior surface 124 of the storage portion 102 proximate to the fastening system. The recess 122 may be used to lift, pry, or otherwise unfasten the first and second fastening portions 116, 118 to open the cover 104 to expose the main compartment 112.

Figure 8:
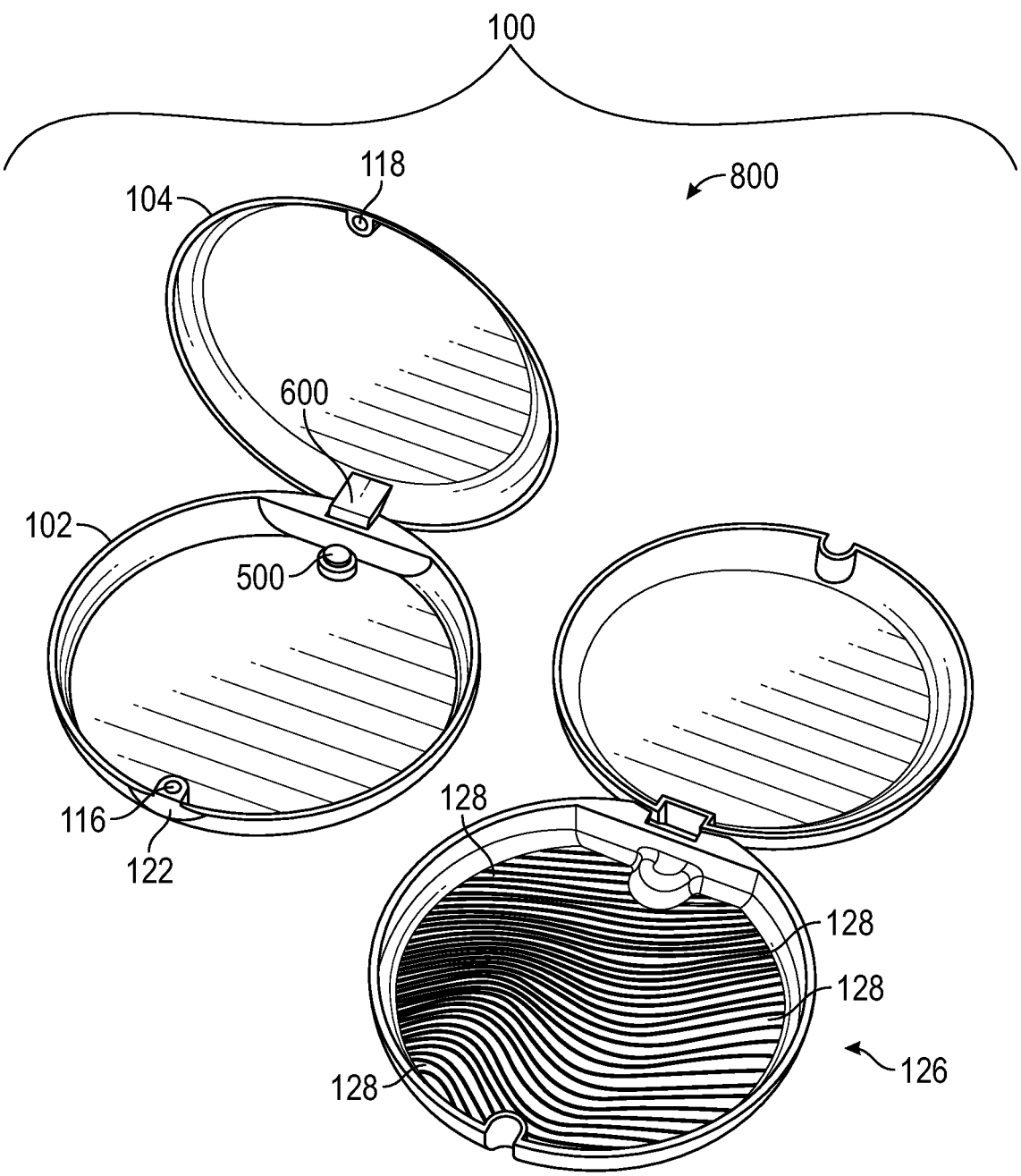
FIG. 8 is a perspective view of the storage case of FIG. 1 with an inner shell removed therefrom, according to an illustrative embodiment.

In some embodiments, the storage case 100 includes an inner shell 126. The inner shell 126 may have a surface contour which is complementary to a surface contour of the inner wall 108 and interior base 110 of the storage portion 102 and the interior-facing surface 120 of the cover 104. The inner shell 126 is configured to span the surfaces of the storage case 100 which define the main compartment 112. The inner shell 126 may be removable from the storage case 100. Specifically, FIG. 8 shows a perspective view of the storage case 100 with the inner shell 126 removed therefrom. A user may remove the inner shell 126 from an outer shell 800 of the storage case 100 (for instance, to clean the inner shell 126) and re-position the inner shell 126 in the outer shell 800 of the storage case 100. In some embodiments, the inner shell 126 may include a plurality of channels 128 formed in an upwardly-facing surface of the inner shell 126 along the interior base 110. The channels 128 may be formed in a wave pattern (as shown), or in other patterns. The channels 128 are configured to form a gap between the dental appliance 114 and the upwardly-facing surface of the inner shell 126. The channels 128 may provide a separation between the dental appliance 114 and any fluid (e.g., water, saliva, toothpaste, or any other fluids) which may be present in the main compartment 112. As such, fluid in the main compartment 112 may reside in the channels 128 rather than contacting the dental appliance 114.

The storage case 100 is shown to include ports 130. As can be best seen in FIG. 5, the ports 130 may be designed or implemented to permit airflow through the main compartment 112 or to enable a fluid to drain from the storage case 100. As shown in FIG. 1, the ports 130 may be formed in the inner shell 126. For instance, as can be best seen in FIG. 1 and FIG. 5, the ports 130 are formed along a perimeter of the inner shell 126 adjacent to the interior wall 108 at opposing sides of the storage case 100, and not formed into the interior wall 108. In some embodiments, the ports 130 are also formed into the interior wall 108, or formed only into the interior wall 108 and not formed in the inner shell 126. In these and other embodiments, the ports 130 are configured to form a passage into the storage portion 102. The ports 130 provide or permit airflow through the main compartment 112 to assist in drying the main compartment 112 including the contents of the main compartment 112 (e.g., the dental appliance 114 when the dental appliance 114 is removed from the user's mouth and placed in the storage case 100). The ports 130 also enable fluid (e.g., water, saliva, toothpaste) to drain from the storage case 100 should the storage case 100 be positioned or held such that either one of the ports 130 are downward facing.

Figure 9:
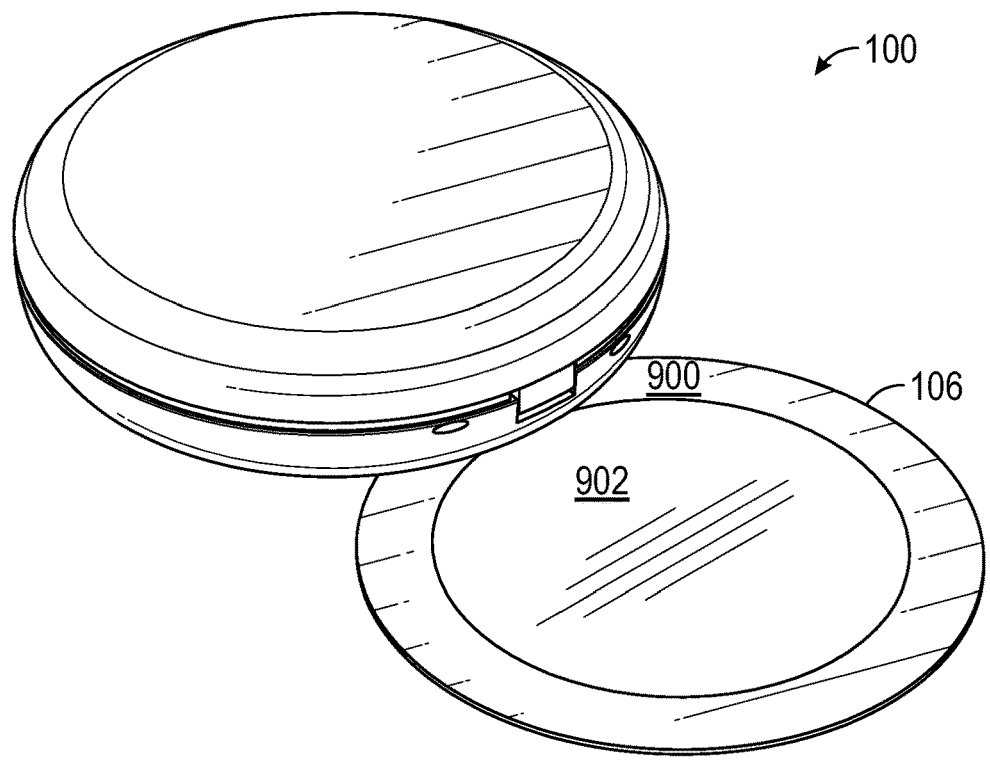
FIG. 9 is a perspective view of the storage case of FIG. 1 with a base in an open position, according to an illustrative embodiment.

FIG. 9 shows a perspective view of the storage case 100 with the base 106 in an open position. The base 106 is configured to move between an open position (shown in FIG. 9) and a closed position (shown in FIG. 1). The base 106 includes a bottom surface 200 (shown in FIG. 2) and a top surface 900 (shown in FIG. 9). The bottom surface 200 is the outermost surface of the base 106 and, therefore, an outermost, external-facing surface of the storage case 100. The top surface 900 is internally-facing and abuts the interior base 110 of the main compartment 112 when in the base 106 is in the closed position. In some embodiments, the top surface 900 may include a reflective portion 902 (e.g., a mirror). In some embodiments, the top surface 900 may include other components, such as light emitting diodes (LEDs) or other light sources. The light sources may be embedded in the top surface 900 of the base 106 such that the light sources illuminate the user as the user uses the reflective portion 902. The reflective portion 902 may be formed by positioning a reflective material (e.g., a mirror) on top of the top surface 900 or integrated within the base 106 such that the reflective material forms part of the top surface 900. When the base 106 is in the open position, a user may be able to view the top surface 900, including the reflective portion 902. When the base 106 is in the closed position, the user is not able to view the top surface 900 or the reflective portion 902. As the reflective portion 902 is positioned on the base 106, which is movable separate from the cover 104, the user is able to view the reflective portion 902 of the base 106 without opening the cover 104. Such embodiments may secure the contents of the storage case 100 (e.g., by limiting opening of the cover 104 to instances in which the contents are to be removed or replaced in the storage case 100) while still permitting use of the reflective portion 902.

In some embodiments, the base 106 may be rotatably coupled to the main compartment 112. As can be best seen in FIG. 5, the storage case 100 may include a pin 500 which extends through the base 106, the main compartment 112, and at least partially into the cover 104. The pin 500 may define an axis R by which the base 106 and cover 104 rotate with respect to the main compartment 112. As can be best seen in the transition between FIG. 9 and FIG. 1, the base 106 may be configured to rotate about axis R between the open position shown in FIG. 9 and the closed position shown in FIG. 1.

Figure 15:
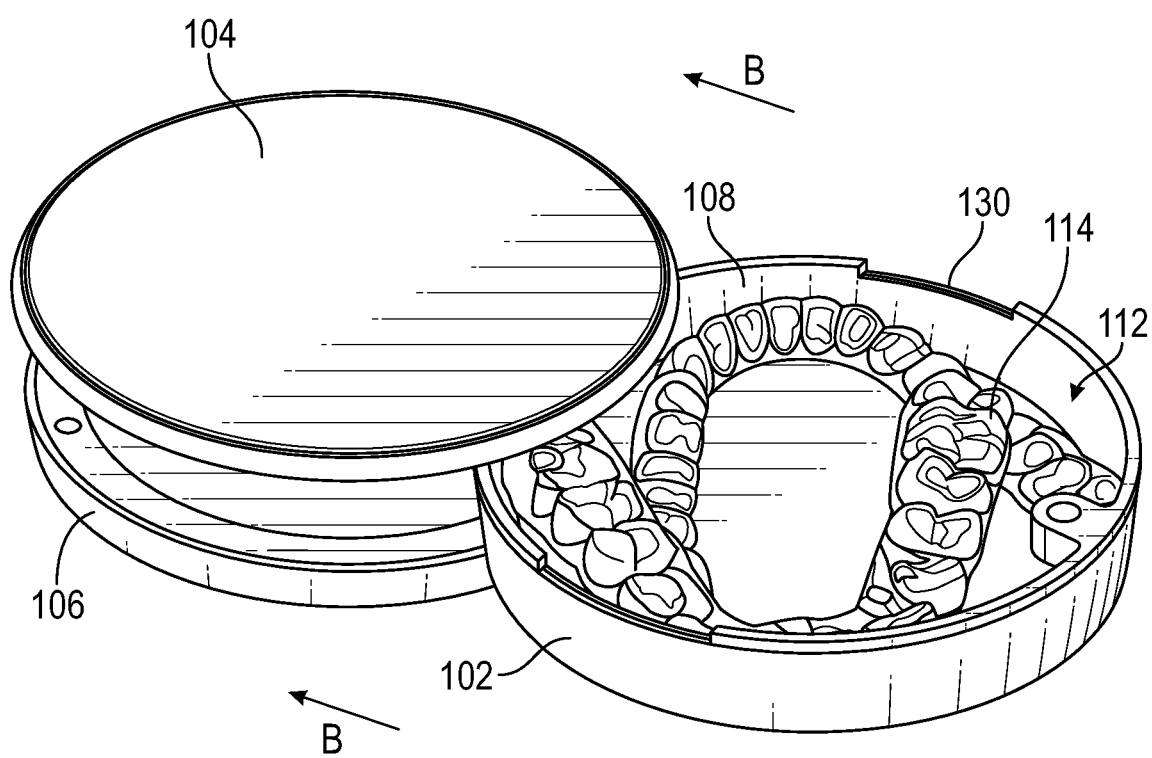
FIG. 15 is a perspective view of an alternative embodiment of the storage case of FIG. 1.
Figure 16:
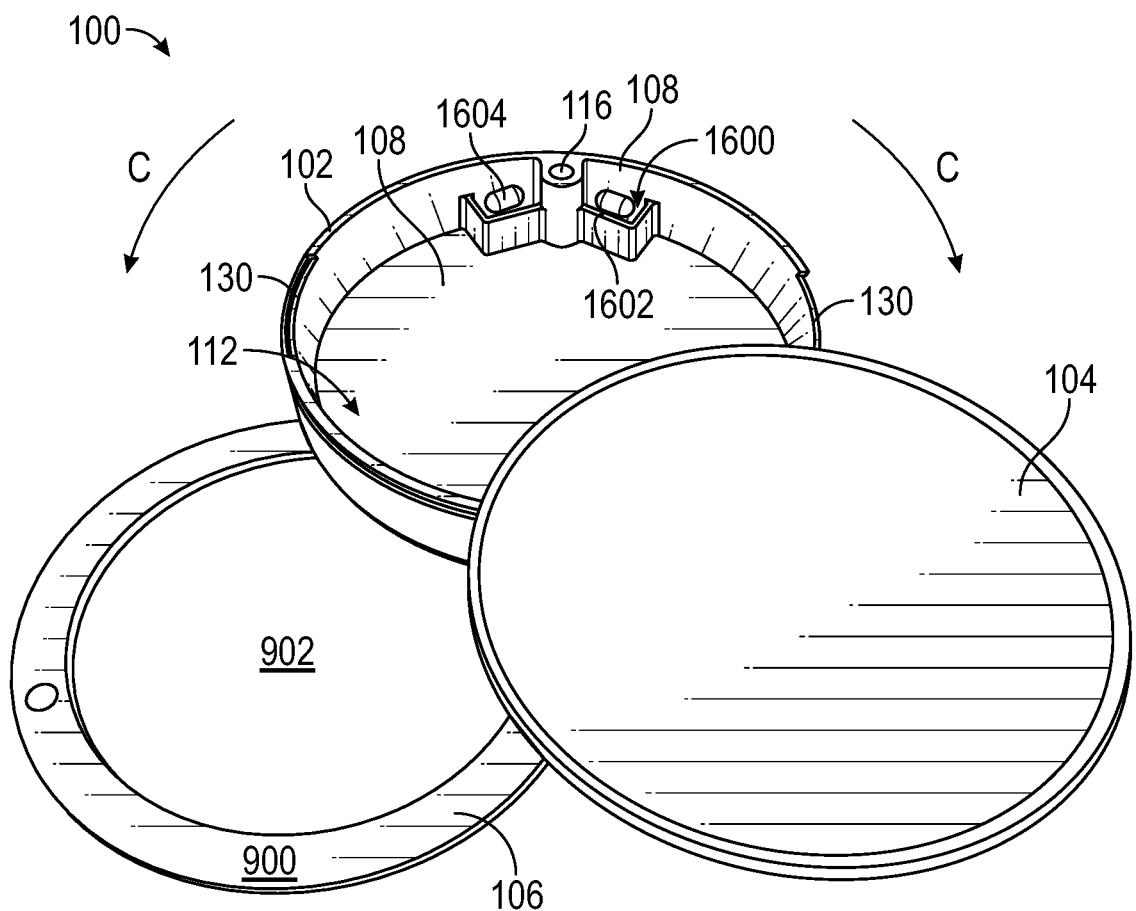
FIG. 16 is a perspective view of an alternative embodiment of the storage case of FIG. 1.

FIG. 15 and FIG. 16 show alternative embodiments of the storage case 100. As shown in FIG. 15, the cover 104 and/or base 106 may be slidably coupled to the main compartment 112. As shown in FIG. 16, the cover 104 can be pivotably coupled to the main compartment 112 while the base 106 is rotatably coupled to the main compartment 112. For example, in the embodiment of FIG. 15, the cover 104 and base 106 can include tracks that extend parallel to one another on opposite sides of the main compartment 112. The tracks may be positioned on interior-facing surfaces (e.g., surfaces facing the main compartment 112) of the cover 104 and base 106. The main compartment 112 may include tabs positioned at the top of the interior wall 108 and on an outwardly facing surface of the interior base 110 (e.g., facing the base 106). The tabs may be positioned on opposite sides of the main compartment 112. The tabs may be aligned with the tracks such that the tabs are configured to be positioned within the corresponding tracks. The tabs and tracks may together form a railing (or slide) system by which the cover 104 and base 106 slide between the open/open and closed/closed positions, as illustrated by arrows B shown in FIG. 15. In the embodiment of FIG. 16, both the cover 104 and base 106 may be rotatably coupled to the main compartment 112. Both the cover 104 and base 106 may include respective pins (or both the cover 104 and base 106 may share a common pin) similar to the embodiments described above with respect to the base 106. The cover 104 and base 106 may rotate via the pin(s) along arrows C shown in FIG. 16.

In some embodiments, the cover 104 may be pivotably coupled to the main compartment 112, and the base 106 may be slidably coupled to the main compartment 112. In other embodiments, the cover 104 and the base 106 may both be pivotably coupled to the main compartment 112. Hence, various combinations of coupling systems may be used for coupling the cover 104 and/or base 106 to the storage portion 102.

As shown in FIG. 16, the main compartment 112 can include one or more sub-compartments 1600. The sub-compartments 1600 are defined by dividers 1602 located, formed, or otherwise positioned in the main compartment 112. In some embodiments, the sub-compartment(s) 1600 are designed or implemented to hold and retain an object smaller than the dental appliance 114. For instance, the sub-compartment(s) 1600 are configured to hold and retain a plurality of seating devices 1604, such as breath mints or other chewable object, for assisting the user in seating a dental appliance 114 onto the user's teeth. For instance, where the dental appliance 114 is a pair of dental aligners (as shown), the user may place an upper dental aligner on the user's upper teeth and a lower dental aligner on the user's lower teeth, position the seating devices 1604 between the upper and lower dental aligners, and then gently bite down on the seating devices 1604 while the seating devices 1604 are sandwiched between the upper and lower dental aligners. By seating the dental aligners in this fashion, the seating devices 1604 help distribute the biting force to prevent inadvertent damage to the dental aligners while providing an opposing force to each dental aligner to help push the dental aligners onto the upper and lower teeth of the user.

Figure 10:
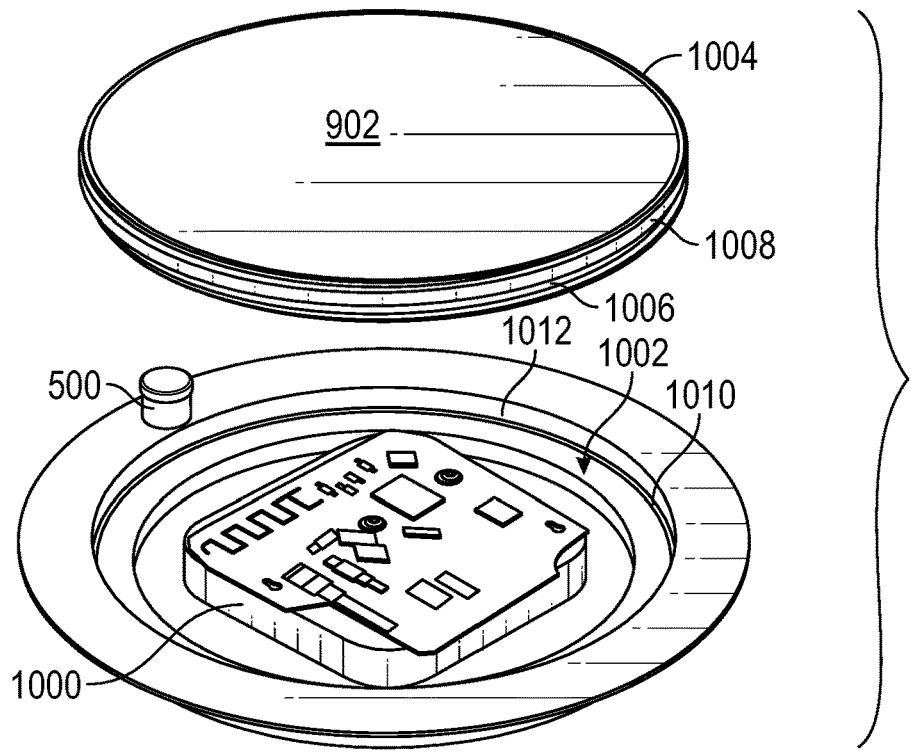
FIG. 10 is an exploded view of the base of the storage case of FIG. 1, according to an illustrative embodiment.
Figure 11:
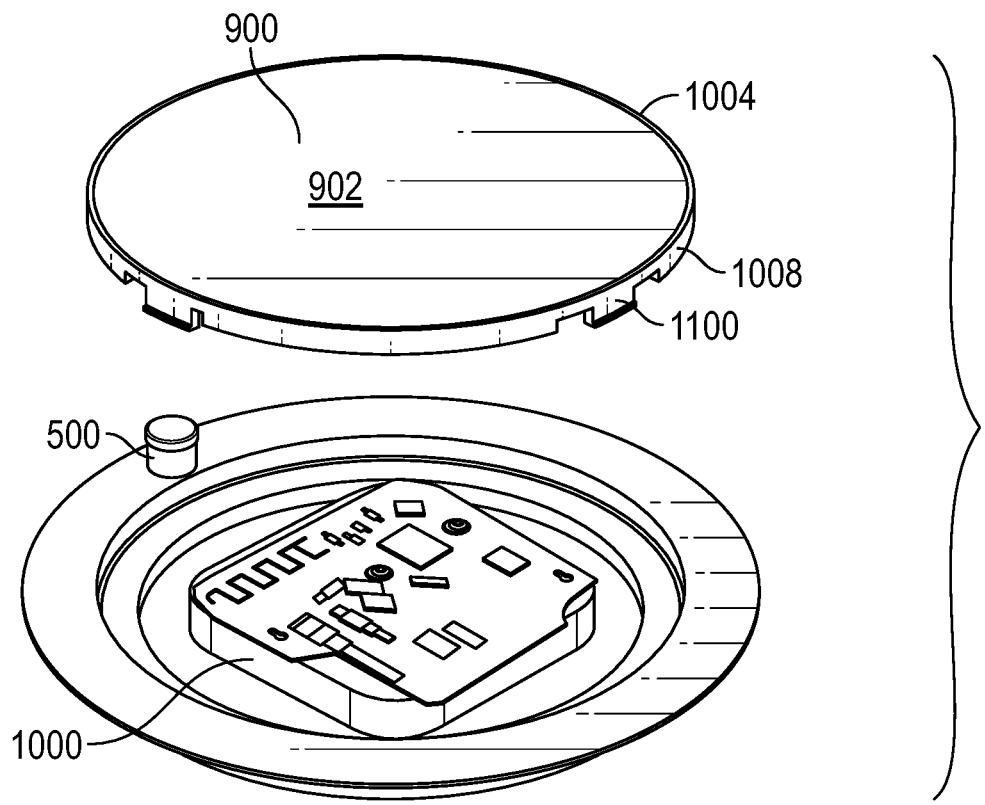
FIG. 11 is an exploded view of the base of the storage case of FIG. 1, according to an illustrative embodiment.

Referring now to FIG. 10 and FIG. 11, exploded views of the base 106 of the storage case 100 are shown, according to illustrative embodiments. In some embodiments, the storage case 100 includes a location device 1000. The location device may be integrally formed within the storage case 100, such as within the base 106 of the storage case 100. As shown in FIG. 10 and FIG. 11, the base 106 may include a housing 1002 defined by a base cover 1004. The base cover 1004 may include the top surface 900 of the base 106 with the reflective portion 902. The housing 1002 is configured to house the location device 1000. In some embodiments, the base cover 1004 may be screwedly coupled to the base 106 (as shown in FIG. 10). For instance, the base cover 1004 may include a threaded portion 1006 arranged along an outer perimeter 1008 of the base cover 1004 configured to engage with a threaded portion 1010 arranged along an inner surface 1012 of the base 106. In this embodiment, the location device 1000 may be positioned in the housing 1002 and the base cover 1004 may be screwed into the base 106 to secure the location device 1000 within the housing.

As shown in FIG. 11, in some embodiments, the base cover 1004 may be coupled to the base 106 via a snap coupling. In this embodiment, the base cover 1004 may include a plurality of tabs 1100 arranged along the outer perimeter 1008 configured to engage in corresponding slots arranged along the inner surface 1012 of the base. In this embodiment, the location device 1000 may be positioned in the housing 1002 and the base cover 1004 may be pushed into the base 106 with the tabs 1100 engaging corresponding slots. In some embodiments, the tabs 1100 may be snapped into their respective slots, and then turned with respect to the base cover 1004 (e.g., a quarter turn) such that the tabs 1100 slide along a respective channel to securely couple the base cover 1004 over the location device 1000.

Figure 12:
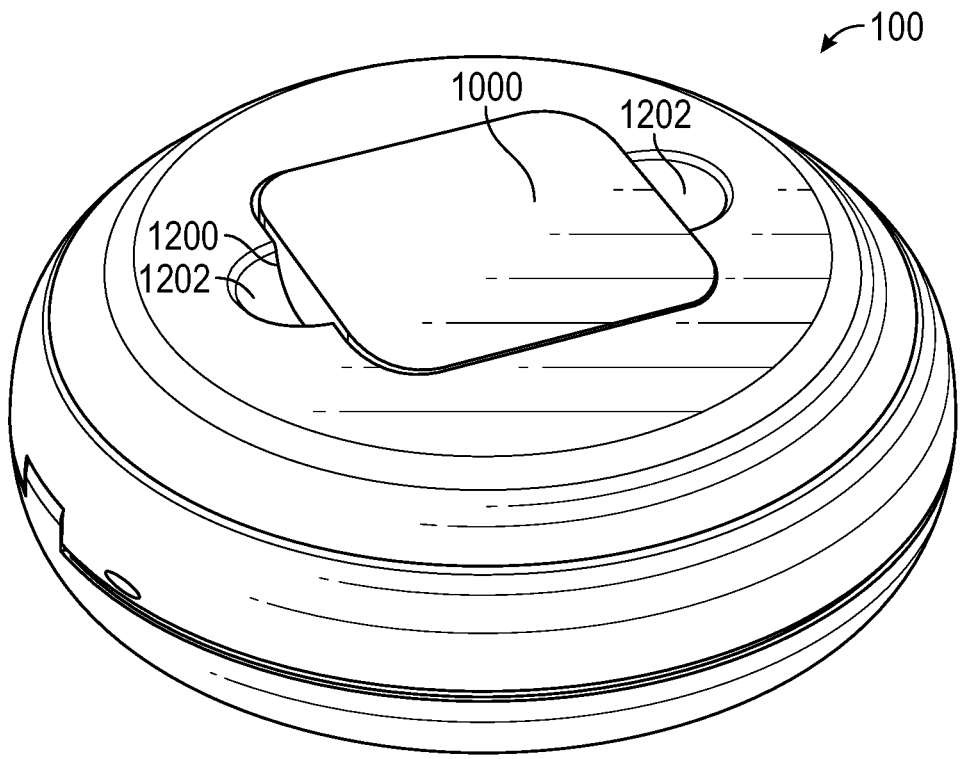
FIG. 12 is a bottom perspective view of the storage case of FIG. 1 with a removable location device, according to an illustrative embodiment.

Referring now to FIG. 12, a bottom perspective view of the storage case 100 with a removable location device 1000 is shown. As shown in FIG. 12, in some embodiments, the location device 1000 may be removable. The bottom surface 200 may include a cavity 1200 sized to fit the location device 1000. The location device 1000, when positioned in the cavity 1200 may sit substantially flush with the bottom surface 200. The cavity 1200 may include one or more recesses 1202 to assist a user in removing the location device 1000 from the cavity 1200.

Figure 13:
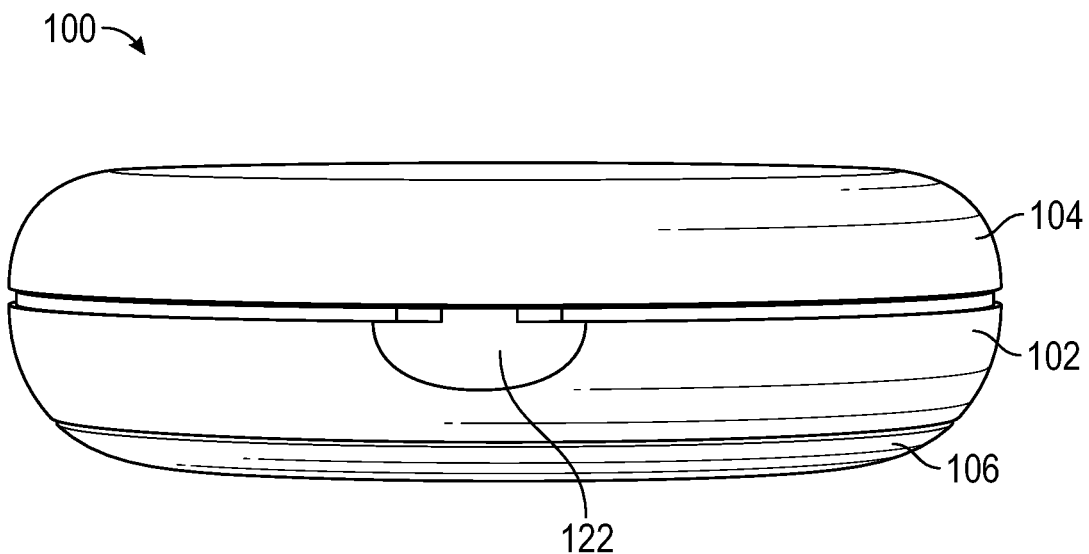
FIG. 13 is a side view of the storage case of FIG. 1 without a location device included, according to an illustrative embodiment.
Figure 14:
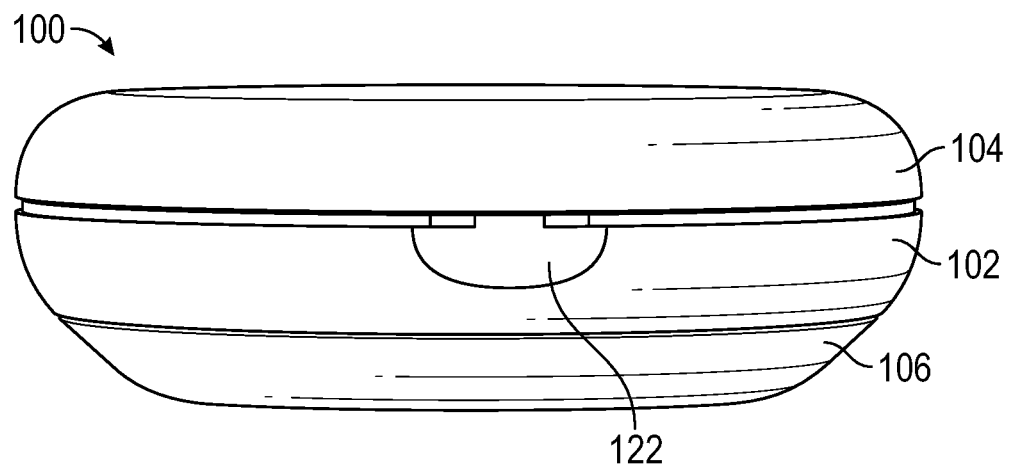
FIG. 14 is a side view of the storage case of FIG. 1 with the location device included, according to an illustrative embodiment.

As shown in FIG. 13 and FIG. 14, the storage case 100 may have a different profile to accommodate for the location device. Specifically, FIG. 13 shows a side view of the storage case 100 where a location device 1000 is not included in the base 106, and FIG. 14 shows a side view of the storage case 100 where the location device 1000 is included in the base 106. As can be seen in FIG. 13 and FIG. 14, the main compartment 112 and cover 104 may have substantially the same dimensions, whereas the base 106 may have different dimensions when a location device 1000 is included. As described in greater detail below, the location device 1000 may assist a user in tracking the location of the storage case 100.

Figure 17:
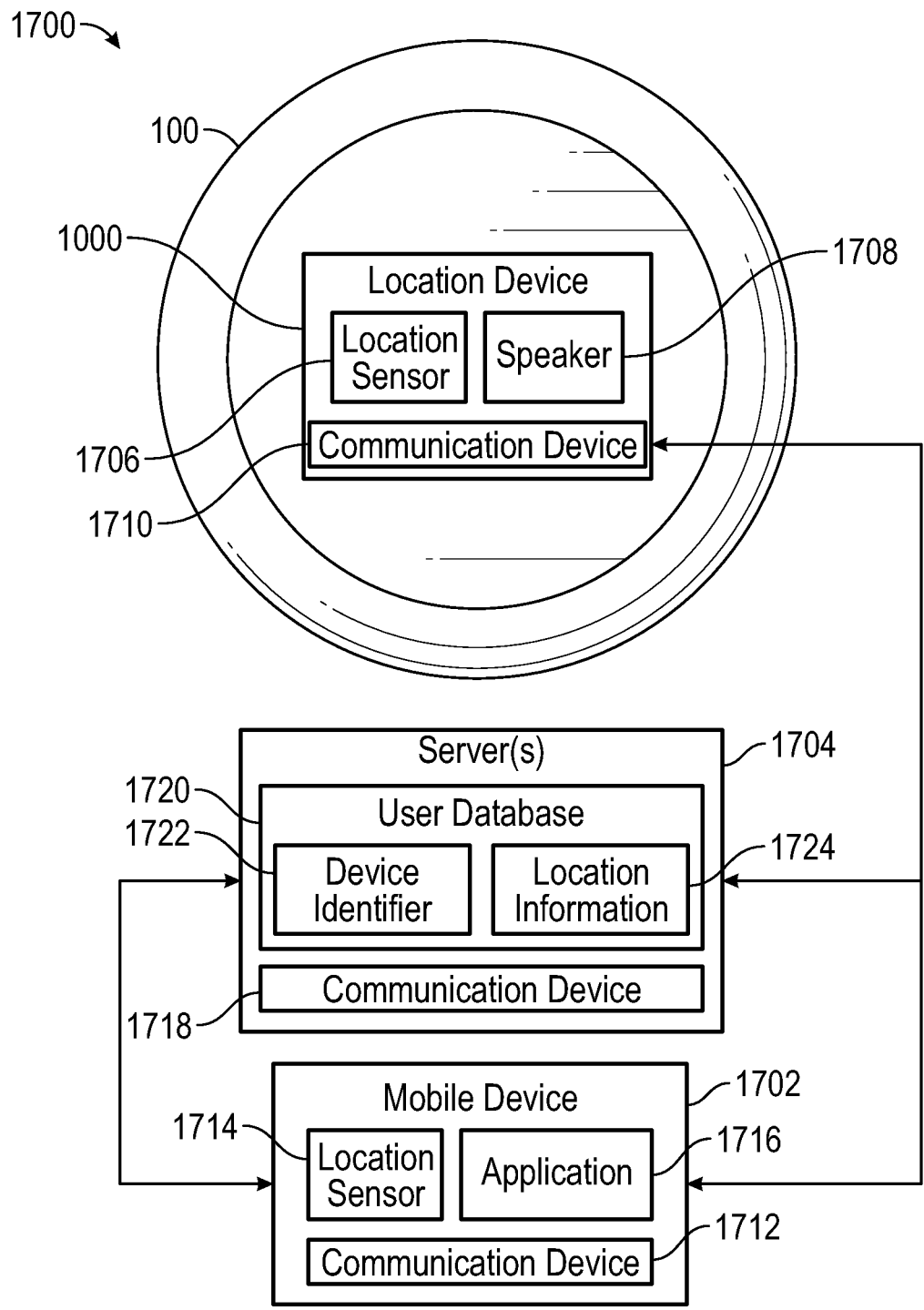
FIG. 17 is a schematic of a storage case location system including the storage case of FIG. 1 with the location device, according to an illustrative embodiment.

Referring now to FIG. 17, a system 1700 for locating the storage case 100 including a location device 1000 is shown, according to an illustrative embodiment. The system 1700 includes the storage case 100 including the location device 1000, a mobile device 1702, and a server 1704.

The location device 1000 is configured to assist a user in locating the storage case 100. In some embodiments, the location device 1000 is embedded into the storage case 100. In some embodiments, the location device 1000 is embedded in the base 106. In some embodiments, the location device 1000 is embedded into the interior base 110 of the main compartment 112. In still other embodiments, the location device 1000 may be embedded into the cover 104. The location device 1000 includes a location sensor 1706, a speaker 1708, and a communication device 1710.

The location sensor 1706 may be or include any device(s) or component(s) designed or implemented to generate location-based data corresponding to a location of the storage case 100. The location sensor 1706 may be a sensor within a Global Positioning System (GPS), for instance. The speaker 1708 may be configured to generate and distribute sound into an environment (e.g., outside of the storage case 100). The communication device 1710 is configured to provide or facilitate communication between the location device 1000 and one or more external devices, such as the server 1704 and the mobile device 1702. The communication device 1710 may communicate according to various communication protocols such as Bluetooth, Wi-Fi, etc.

The mobile device 1702 includes a communication device 1712, a location sensor 1714, and an application 1716. The mobile device 1702 may be associated with a user, such as the owner of the storage case 100 and/or dental appliance 114.

Similar to the communication device 1710, the communication device 1712 is configured to provide or facilitate communication between the mobile device 1702 and one or more external devices, such as the server 1704 and the location device 1000. The communication device 1712 may communicate according to various communication protocols such as Bluetooth, Wi-Fi, and the like. The location sensor 1714 is configured to generate location-based data corresponding to a location of the mobile device 1702. The location sensor 1714 may be a sensor within a GPS of the mobile device 1702. The application 1716 is configured to facilitate or provide interaction between the user and the location device 1000 (e.g., by a user interface of the mobile device 1702). The application 1716 may be offered by a producer of the storage case 100 and/or the dental appliance 114. The application 1716 may be offered by a third-party (e.g., by an entity other than the producer of the storage case 100 and/or the dental appliance 114 or the user, such as an entity which tracks locations of various devices). In some embodiments, the application is offered by the producer of the storage case 100 and/or dental appliance 114 and uses data from a third-party (e.g., through a corresponding Application Programming Interface (API), for instance). As described in greater detail below, the user may use the application 1716 for identifying a location of the storage case 100.

The server 1704 includes a communication device 1718 and user database 1720. The communication device 1718 is similar to the communication device 1712 of the mobile device 1702 and communication device 1710 of the location device 1000. The communication device 1718 is designed or implemented to provide or facilitate communication between the server 1704 and one or more external devices. The communication device 1718 may communicate via various networks (such as a Wide Area Network (WAN), Local Area Network (LAN), cellular network, or other networks). The user database 1720 may be or include a data structure configured to store various data corresponding to particular registered users. The user database 1720 includes a device identifier 1722 and location information 1724. The device identifier 1722 is an identifier associated with the location device 1000. The device identifier 1722 may be received from the mobile device 1702 (e.g., responsive to successful pairing of the mobile device 1702 and location device 1000) and/or from the location device 1000. The device identifier 1722 may be used by the mobile device 1702 for cross-referencing with a device identifier received in a request for identifying the last known location of the storage case 100, as described in greater detail below. The location information 1724 includes location-based data corresponding to the storage case 100. The location-based data may be GPS data, coordinates (e.g., latitude and longitude), proximity data, a last known location of the location device 1000, etc. The location information 1724 may be received by the server 1704 from the mobile device 1702 and/or from the location device 1000. The location information 1724 may be refreshed with new location information 1724 as new location information 1724 is received from the mobile device 1702 and/or location device 1000.

The user may pair their mobile device 1702 with the location device 1000. The user selects a pairing option via the application 1716 on the mobile device 1702. The mobile device 1702 and location device 1000 may perform a handshaking to pair with one another. The communication device 1710 is configured to exchange data with the mobile device 1702 via the communication device 1712 responsive to successful pairing of the mobile device 1702 and location device 1000.

The mobile device 1702 may be configured to receive a selection from the user to launch the application 1716. The user may launch the application 1716 when the user attempts to locate their misplaced storage case 100. The application 1716 may be configured to render a map including a location of the storage case 100 based on the location-based data from the location sensor(s) 1706, 1714. The location may be the current location of the storage case 100 or the last-known location of the storage case 100. In some embodiments, the mobile device 1702 may download or otherwise retrieve the location information 1724 from the server 1704 for all known devices based on the device identifier(s) 1722 within the user data for the user when the user launches the application 1716. The user may travel to the location indicated on the map rendered on a user interface generated by the application 1716 to locate and retrieve their storage case 100.

The application 1716 may be configured to render a location of the storage case 100 on a map displayed on a user interface of the mobile device 1702. The location may be a current location of the storage case 100 or a last known location of the storage case 100. In some embodiments, the mobile device 1702 executing the application 1716 may receive the location-based information from the location device 1000 (e.g., when the location device 1000 is within range of the mobile device 1702). In such embodiments, the location is based on the location-based data received directly from the location device 1000 of the storage case 100. In some embodiments, the location may be inferred based on a location of the mobile device 1702. For instance, when the mobile device 1702 is within range of the location device 1000, the mobile device 1702 infers that the location device 1000 is located at approximately the same location as the mobile device 1702. In such embodiments, the location is an inferred location of the location device 1000 based on a determined location of the mobile device 1702 when the mobile device 1702 is in range or last was in range of the location device 1000. In some embodiments, the mobile device 1702 may retrieve the location information 1724 from the server 1704 for rendering the location on the map. The map may assist a user in traveling to the last known location or current location of the storage case 100.

In some embodiments, the user may locate the storage case 100 by triggering a sound via the speaker 1708 through the application 1716. The user may select an option on a user interface for the application 1716 to trigger a sound via the speaker 1708. The mobile device 1702 generates and transmits a signal to the location device 1000. In some embodiments, the mobile device 1702 may generate and transmit the signal to the location device 1000 when the location device 1000 is within range of the mobile device 1702. The mobile device 1702 may be within range of the location device 1000 when the communication device 1710 of the location device 1000 is communicably coupled to the communication device 1712 of the mobile device 1702 (e.g., within 10 feet, 20 feet, 50 feet, 100 feet, etc.). In some embodiments, when the mobile device 1702 is not within range of the location device 1000, the user interface for the application 1716 may render (e.g., on a map) the last known location or current location of the storage case 100, as described above, or an indication that the storage case 100 is not within range of the mobile device 1702 and that the user should search a different area for the storage case 100.

The mobile device 1702 is configured to generate a signal which causes the speaker 1708 to generate a sound for assisting the user in locating the storage case 100. The user selects an option for generating the sound via the application 1716 on the user's mobile device 1702. The mobile device 1702 is configured to transmit a signal to the location device 1000. When or after the communication device 1710 receives the signal from the mobile device 1702, the location device 1000 automatically controls the speaker 1708 to generate a sound for assisting the user in locating the storage case 100.

In some embodiments, the location device 1000, mobile device 1702, and/or server(s) 1704 (collectively referred to hereinafter as devices 1000, 1702, 1704) may be configured to offload data corresponding to the location of the storage case 100 to a computing device or server associated with a producer of the dental appliance 114. The devices 1000, 1702, 1704 may offload the data corresponding to the location to the producer at various intervals (e.g., once an hour, once a day, etc.). The producer may monitor the location of the storage case 100 for issuing one or more reminders to the mobile device 1702 of the user. For instance, the producer may track the location of the storage case 100 to determine whether the storage case 100 has moved (e.g., indicating that the storage case 100 is on the user's person). Where the storage case 100 has not moved for a predetermined number of hours, days, etc. (which may indicate that the user is not wearing their dental appliance 114), the producer may automatically generate a notification for communicating to the mobile device 1702 of the user. The notification may be rendered on the mobile device 1702 (e.g., via the application 1716, for instance). The notification may remind the user to wear their dental appliance 114. In this regard, the computing device or server associated with a producer of the dental appliance 114 may be configured to generate a notification to remind the user to wear their dental appliance 114 when the location of the storage case 100 indicates that storage case 100 has not moved for a predetermined duration indicative of the user not wearing their dental appliance 114.

Figure 18:
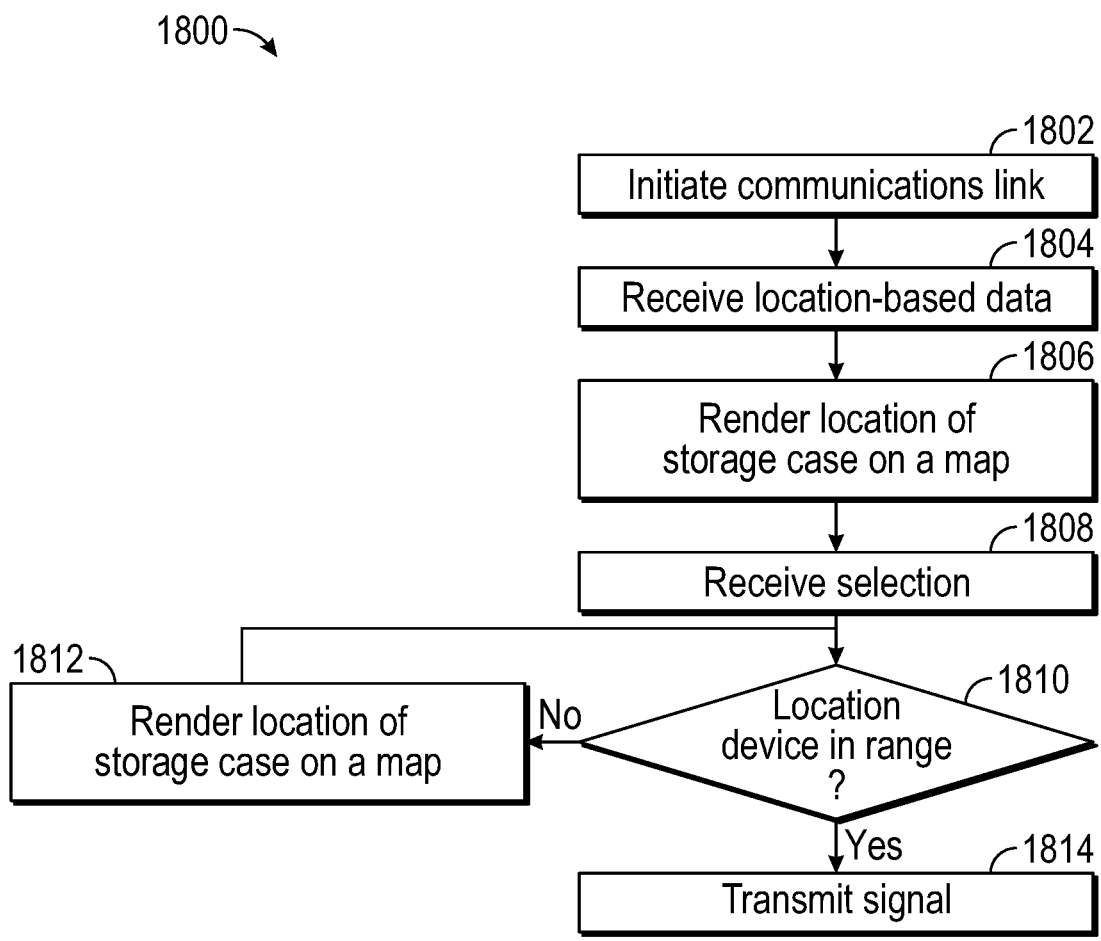
FIG. 18 is a flowchart of a method of locating the storage case of FIG. 1, according to an illustrative embodiment.

Referring now to FIG. 18, a flowchart showing a method 1800 of locating a storage case 100 for a dental appliance 114 is shown, according to an illustrative embodiment. The method 1800 may be implemented on or by, for instance, the mobile device 1702 and/or server 1704 described with reference to FIG. 17. The method 1800 is described with reference to the storage case 100, mobile device 1702, and server 1704.

At step 1802, the mobile device 1702 initiates a communications link between the mobile device 1702 and the location device 1000. The location device 1000 is incorporated into the storage case 100 for a dental appliance 114. The mobile device 1702 initiates the communications link responsive to receiving a pair request from a user operating an application 1716 on the mobile device 1702. In some embodiments, the communications link is established between a communication device 1710 of the location device 1000 for the storage case 100 and a communication device 1712 of the mobile device 1702. In some implementations, the communications link may be a Bluetooth communications link. The mobile device 1702 and/or location device 1000 are configured to exchange data, information, etc. across the communications link.

At step 1804, the mobile device 1702 receives location-based data corresponding to a location of the storage case 100. The mobile device 1702 may receive the location-based data from a location sensor 1706 for the location device 1000. The mobile device 1702 may receive the location-based data from a location sensor 1714 for the mobile device 1702. In embodiments when the mobile device 1702 receives the location-based data from the location sensor 1714, the location-based data corresponds to a location of the storage case 100 when the location device 1000 is located within range (e.g., within 10 feet, 20 feet, 100 feet, etc.) of the mobile device 1702. In some embodiments, the location may be a current location of the storage case 100. In some embodiments, the location may be a last-known location of the storage case 100 (such as location-based data when the location device 1000 was last in range with the mobile device 1702). In such embodiments, the last-known location of the storage case 100 may be identified based on the location-based data generated by a location sensor 1714 for the mobile device 1702 when the mobile device 1702 was last within range of the location device 1000 of the storage case 100.

At step 1806, the mobile device 1702 renders a location of the storage case 100 on a map. The mobile device 1702 renders the location of the storage case 100 on a user interface for the application 1716. The mobile device 1702 may render the location on the map when the user launches the application 1716 on the user's mobile device 1702. The mobile device 1702 may render the location on the map when the user selects or launches a map within the application 1716 on the user's mobile device 1702. The mobile device 1702 may render the location on the map when the user selects the storage case 100 from a list of devices provided on the application 1716 of the mobile device 1702. In each embodiment, the mobile device 1702 renders the location of the storage case 100 on a map. The location is identified based on the location-based data received at step 1804. Hence, the location may be the current location or the last known location.

At step 1808, the mobile device 1702 receives a selection for assisting the user in locating the storage case 100. The user operating the application 1716 may provide the selection via a user interface element for the application 1716. In some embodiments, the selection is a selection for generating a sound via a speaker 1708 of the location device 1000.

At step 1810, the mobile device 1702 determines whether the location device 1000 is within range of the mobile device 1702. The mobile device 1702 may determine whether the location device 1000 is within range of the mobile device 1702 by sending a ping to the location device 1000 and waiting for a response from the location device 1000. The mobile device 1702 may determine whether the location device 1000 is within range of the mobile device 1702 by identifying devices currently paired with the mobile device 1702. Where the mobile device 1702 is determined to not be within range of the location device 1000, the method 1800 proceeds to step 1812 where the mobile device 1702 continues to render a location of the storage case 100 on a map. Step 1812 may be substantially the same as step 1806. Where the mobile device 1702 is determined to be within range of the location device 1000, the method 1800 proceeds to step 1814.

At step 1814, the mobile device 1702 transmits a signal to the location device 1000 of the storage case 100. The signal is sent via the communications link initiated at step 1802. The location device 1000 receives the signal via the communication device 1710. The location device 1000 controls the speaker to generate a sound. The sound may assist the user in locating the storage case 100.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It should be appreciated that other elements of the various embodiments may be incorporated or utilized with any of the other embodiments disclosed herein.

What is claimed is:

1. A storage case for a dental appliance, the storage case comprising:
    a storage portion including a compartment having an opening facing a direction, the compartment configured to hold a dental appliance of a user;
    a cover coupled to a first side of the storage portion and configured to selectively move between an open position and a closed position by a first movement type, the cover permitting access to the compartment when the cover is in the open position, the cover restricting access to the compartment when the cover is in the closed position;
    a base coupled to a second side of the storage portion opposite the cover and configured to selectively move between an open position and a closed position by a second movement type different than the first movement type, wherein the base includes a bottom surface and a top surface, wherein the top surface includes a reflective portion, wherein the top surface is viewable by a user when the base is in the open position and the top surface is not viewable by the user when the base is in the closed position; and
    a location device comprising a communications device and a speaker, the speaker configured to generate a sound based on the communications device receiving a signal from a mobile device of the user.

2. The storage case of claim 1, wherein the storage portion comprises at least one port configured to permit airflow through the compartment.

3. The storage case of claim 1, wherein the dental appliance is a dental aligner configured to be worn on teeth of the user.

4. The storage case of claim 1, wherein the compartment is a main compartment that comprises at least one sub-compartment within the main compartment, the at least one sub-compartment configured to hold a seating device.

5. The storage case of claim 4, wherein the dental appliance is a dental aligner configured to be worn on teeth of the user, wherein the seating device is configured to be positioned along a molar portion of the dental aligner when the dental aligner is positioned on the teeth of the user and to be compressed by the dental aligner to seat the dental aligner onto the teeth of the user.

6. The storage case of claim 1, wherein the first movement type comprises a hinged movement.

7. The storage case of claim 6, wherein the second movement type comprises a rotatable movement.

8. The storage case of claim 1, further comprising a fastening system, a first fastening portion of the fastening system located on the storage portion, and a second fastening portion of the fastening system located on the cover, the first fastening portion and the second fastening portion configured to engage each other when the cover is in the closed position to maintain the cover in the closed position.

9. The storage case of claim 1, wherein the location device is housed in the base.

10. A storage case for a dental appliance, the storage case comprising:
    a storage portion including a compartment having a substantially circular shape, the compartment having an opening facing a direction, the compartment configured to hold a dental appliance of a user;
    a cover coupled to the storage portion and configured to selectively move between an open position and a closed position by a first movement type, the cover permitting access to the compartment when the cover is in the open position, the cover restricting access to the compartment when the cover is in the closed position; and
    a base coupled to the storage portion opposite the cover and configured to selectively move between an open position and a closed position by a second movement type different than the first movement type, the base including a bottom surface facing away from the storage portion and a top surface facing toward the storage portion in the direction of the opening of the compartment, the top surface including a reflective portion, wherein the top surface is viewable by a user when the base is in the open position and the top surface is not viewable by the user when the base is in the closed position.

11. The storage case of claim 10, wherein the compartment is a main compartment that comprises at least one sub-compartment within the main compartment, the at least one sub-compartment configured to hold at least one object having a size smaller than the dental appliance.

12. The storage case of claim 11, wherein the dental appliance is a dental aligner configured to be worn on teeth of the user, and wherein the at least one object is a seating device configured to be positioned along a molar portion of the dental aligner when the dental aligner is positioned on the teeth of the user and to be compressed by the dental aligner to seat the dental aligner onto the teeth of the user.

13. The storage case of claim 10, further comprising a fastening system, a first fastening portion of the fastening system located on the storage portion and configured to engage a second fastening portion of the fastening system located on the cover when the cover is in the closed position.

14. The storage case of claim 10, wherein the first movement type comprises a hinged movement.

15. The storage case of claim 10, wherein the first movement type comprises a rotatable movement.

16. The storage case of claim 10, further comprising:
a location device comprising a communications device and a speaker, the speaker configured to generate a sound based on the communications device receiving a signal from a mobile device of the user.

17. The storage case of claim 16, wherein the location device is located in the base.

18. The storage case of claim 10, wherein the storage portion further comprises at least one port configured to permit airflow through the compartment.

19. A method of locating a storage case for a dental appliance, the method comprising:
receiving, by a mobile device, location-based data from a location device incorporated into a base of a storage case for a dental appliance, the storage case including a compartment to house the dental appliance and a cover coupled to an opposite side of the storage case than the base and being configured to selectively permit access to the compartment, the location-based data corresponding to a location of the storage case;
rendering, on a user interface of the mobile device, a location of the storage case with respect to a location of the mobile device;
receiving, via the user interface, a user input requesting assistance in locating the storage case; and
transmitting a signal to the location device of the storage case based on the user input, the signal configured to cause a speaker of the location device in the base to generate a sound for assisting the user in locating the storage case.

20. The method of claim 19, wherein rendering the location of the storage case on the user interface comprises rendering a last-known location of the storage case on a map, wherein the last-known location is identified based on the received location-based data when the mobile device was last within range of the location device of the storage case.

21. The method of claim 19, wherein rendering the location of the storage case on the user interface comprises rendering a current location of the storage case on a map.

* * * * *